B. W. HAMMOND.
VEHICLE WHEEL.
APPLICATION FILED JULY 21, 1910.

1,002,582.

Patented Sept. 5, 1911.

Witnesses
H. A. Stock.
H. Jackson Doyle

Inventor
Bennett W. Hammond
By E. E. Trueman,
Attorney.

UNITED STATES PATENT OFFICE.

BENNETT WOODCROFT HAMMOND, OF RICHMOND, CALIFORNIA, ASSIGNOR TO PUNCTURE PROOF TIRE COMPANY, A CORPORATION OF ARIZONA TERRITORY.

VEHICLE-WHEEL.

1,002,582.     Specification of Letters Patent.     Patented Sept. 5, 1911.

Application filed July 21, 1910. Serial No. 573,101.

*To all whom it may concern:*

Be it known that I, BENNETT WOODCROFT HAMMOND, a citizen of the United States, residing at Richmond, in the county of Alameda and State of California, have invented certain new and useful Improvements in Vehicle-Wheels, of which the following is a specification.

This invention relates to spring wheels, and the principal object of the same is to provide a novel resilient connection between the rim and the felly of the wheel by means of which the shock and jars incidental to travel are absorbed.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figures 1, 2:
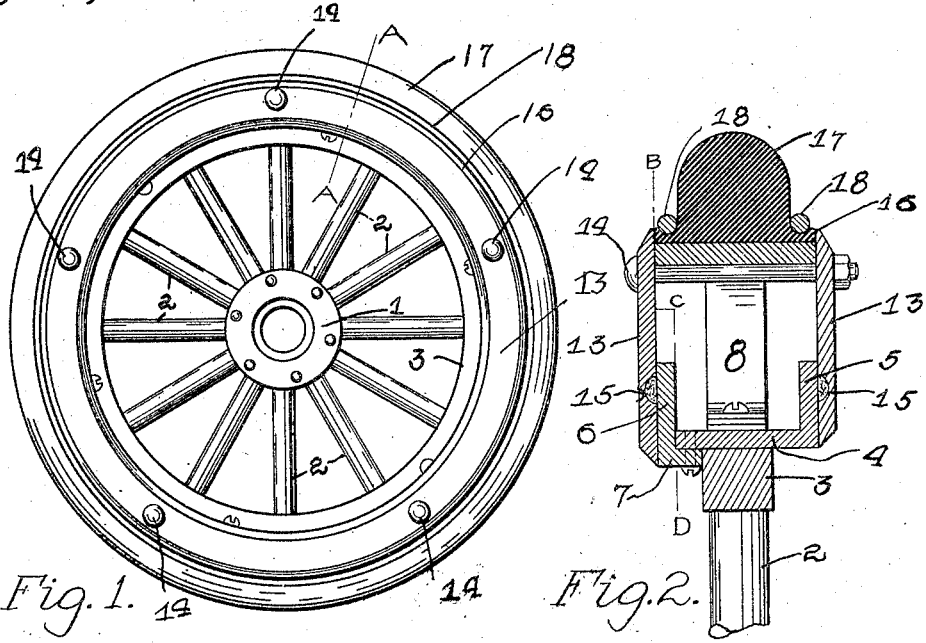
Figure 3:
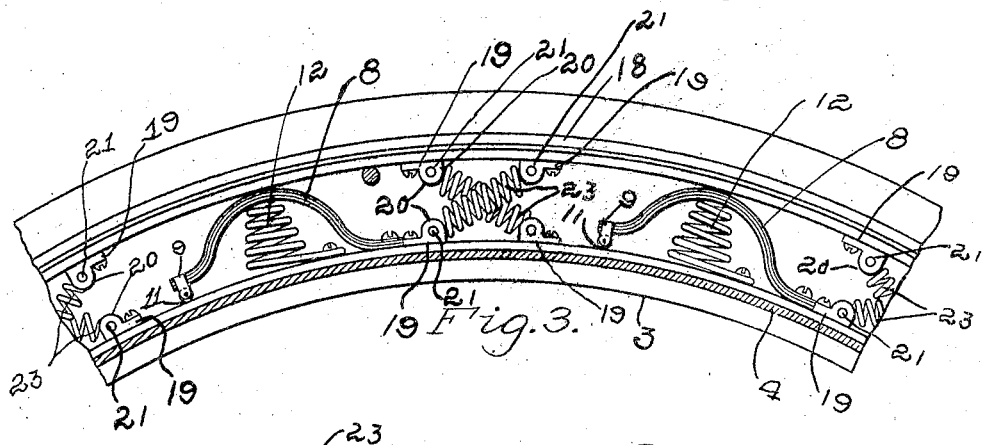
Figures 4, 5:
Figure 6:
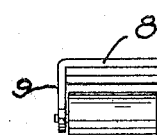

Figure 1 is a view in side elevation of a wheel constructed in accordance with this invention. Fig. 2 is an enlarged transverse sectional view taken on the line A—A, Fig. 1. Fig. 3 is a fragmentary longitudinal sectional view taken on the lines B—C—D, Fig. 2. Fig. 4 is a top plan view of one of the lugs to which the connecting springs are fastened. Fig. 5 is a view in side elevation of a rotatable sleeve used in connection with the lug shown in Fig. 4. Fig. 6 is an end view of one of the springs that are interposed between the felly plate and rim showing an end roller carried thereby.

Referring to the accompanying drawings by numerals, it will be seen that the improved wheel comprises a hub 1 from which the spokes 2 radiate, said spokes carrying the usual felly 3. A plate 4 is carried by the periphery of felly 3, said plate being provided with an outwardly projecting right-angular guard extension 5 at one side. The other side of said plate carries a similar guard 6 the angular base 7 of which is riveted or otherwise rigidly fastened to the underside of plate 4.

Semi-elliptical laminated springs 8 are arranged at regular intervals on the outer surface of plate 4, one end of said springs being bolted or otherwise rigidly but detachably fastened to said plate, and the free ends of said springs having one of their leaves equipped with integral ears 9 in which the shafts 10 are mounted. Shafts 10 are equipped with rollers 11 which travel on plate 4 to reduce friction. Conical spiral springs 12 are also carried by plate 4, said springs being interposed between said plate and the arched portions of springs 8 and obviously oppose compression thereof.

Side plates 13 are slidably clamped to the side guards 5 and 6 of plate 4 by the bolts 14. Said plates are provided with cavities 15 in which felt or other lubricant soaked absorbent material is placed to prevent friction between said plates 13 and the guards 5 and 6. A rim 16 is carried by plates 13, said rim having a resilient tire 17 fastened thereto by the wires 18. Said rim rests on the arched portions of the laminated springs 8.

Rim 16 and plate 4 are provided with a plurality of lugs 19, said lugs being arranged in pairs the members of which are diagonally disposed, one member of each pair being carried by the rim and the other member carried by the plate 4. Each lug is provided with a pair of ears 20 which support a shaft 21 upon which a sleeve 22 is rotatably mounted. Spiral springs 23 are employed for connecting the pairs of lugs, said springs having their ends fastened to the pulleys 22, and obviously being arranged in crossing relation.

In operation it will be seen that the springs 8 oppose the sliding movement of the rim relative to the felly, and that the springs 12 oppose the compression of springs 8. The spring connections 23 between the rim and plate 4 oppose a rotary movement of the rim relative to the felly.

Springs 8 and 12 are placed in position under compression and are therefore constantly exerting a pressure in opposition to a movement that would cause rim 16 to approach plate 4, and springs 23 are placed in position under tension so that they tend to prevent a relative rotation of said rim and plate.

What I claim as my invention is:—

A wheel comprising a felly plate, a rim, clamping plates carried by said rim and slidably engaging the felly plate, a tire carried by the rim, oppositely-disposed sets of lugs carried by the rim and felly plate and provided with ears, shafts carried by said ears, sleeves on said shafts, springs arranged in crossing relation and connected to said sleeves to oppose relative rotation of the rim and felly plate, semi-elliptical springs carried by the felly plate and yieldably supporting the rim, anti-friction means carried by the free ends of said semi-elliptical springs and contacting with the felly plate, and springs carried by the felly plate for opposing compression of the semi-elliptical springs.

In testimony whereof I affix my signature in presence of two witnesses.

BENNETT WOODCROFT HAMMOND.

Witnesses:
F. J. SCHROEDER,
H. C. SCHROEDER.

Copies of this patent may be obtained for five cents each, by addressing the "Commissioner of Patents, Washington, D. C."